(12) United States Patent
Naserian et al.

(10) Patent No.: US 12,128,825 B2
(45) Date of Patent: Oct. 29, 2024

(54) DYNAMICALLY ADJUSTING COLLISION AVOIDANCE METRIC THRESHOLDS BASED ON DRIVER'S FIELD OF VIEW

(71) Applicant: GM Global Technology Operations LLC, Detroit, MI (US)

(72) Inventors: Mohammad Naserian, Windsor (CA); Allan Kenneth Lewis, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 17/840,831

(22) Filed: Jun. 15, 2022

(65) Prior Publication Data

US 2023/0406205 A1    Dec. 21, 2023

(51) Int. Cl.
| | |
|---|---|
| *B60Q 9/00* | (2006.01) |
| *B60T 7/22* | (2006.01) |
| *G06V 20/58* | (2022.01) |
| *G06V 20/59* | (2022.01) |

(52) U.S. Cl.
CPC .............. *B60Q 9/008* (2013.01); *B60T 7/22* (2013.01); *G06V 20/58* (2022.01); *G06V 20/59* (2022.01); *B60T 2250/04* (2013.01)

(58) Field of Classification Search
CPC ....... B60Q 9/008; B60T 7/22; B60T 2250/04; G06V 20/58; G06V 20/59
USPC ..................................................... 701/301
See application file for complete search history.

(56) References Cited

U.S. PATENT DOCUMENTS

| | | | |
|---|---|---|---|
| 5,321,556 A * | 6/1994 | Joe ........................... | B60R 1/082 |
| | | | 248/479 |
| 11,124,143 B1 * | 9/2021 | Pertsel .................. | B60N 2/0027 |
| 11,198,432 B2 * | 12/2021 | Edo Ros ................... | B60T 7/12 |
| 2015/0286885 A1 * | 10/2015 | Bulan ..................... | G06V 10/50 |
| | | | 382/104 |
| 2016/0071417 A1 | 3/2016 | Lewis et al. | |
| 2016/0272215 A1 * | 9/2016 | Laine .................... | G06V 20/597 |
| 2016/0357187 A1 * | 12/2016 | Ansari .................... | G08G 1/165 |
| 2018/0244129 A1 * | 8/2018 | Whitens ................ | G01J 5/0037 |
| 2019/0152390 A1 * | 5/2019 | Levkova ................ | B60W 40/09 |
| 2020/0023772 A1 * | 1/2020 | Kurnaz .................... | G06T 5/90 |
| 2021/0009140 A1 * | 1/2021 | Brooks ............. | B60W 60/0059 |
| 2021/0058555 A1 * | 2/2021 | Xu ..................... | B60W 30/0953 |
| 2021/0114591 A1 * | 4/2021 | Kamiya ................ | B60W 30/09 |
| 2021/0166325 A1 * | 6/2021 | Shalev-Shwartz ......................... | |
| | | | B62D 15/0265 |
| 2021/0291734 A1 * | 9/2021 | Zafeirakis ................ | B60R 1/26 |
| 2022/0009439 A1 * | 1/2022 | Campos Macias .... | G06V 20/44 |

(Continued)

*Primary Examiner* — Andrew R Dyer
(74) *Attorney, Agent, or Firm* — Vivacqua Crane, PLLC

(57) ABSTRACT

A system for dynamically calculating collision avoidance metric thresholds for a vehicle includes a vehicle sensor, a passenger position tracking device, and a controller. The controller is in electrical communication with the vehicle sensor and the passenger position tracking device. The controller is programmed to determine a collision avoidance metric using the vehicle sensor, determine an offset to a collision avoidance metric threshold using the passenger position tracking device, and adjust the collision avoidance metric threshold based on the offset. The controller is also programed to compare the collision avoidance metric to the collision avoidance metric threshold and perform an action in response to determining that the collision avoidance metric is less than or equal to the collision avoidance metric threshold.

17 Claims, 2 Drawing Sheets

(56) References Cited

U.S. PATENT DOCUMENTS

| | | | |
|---|---|---|---|
| 2022/0114817 A1* | 4/2022 | Gronau | G06V 10/82 |
| 2022/0121867 A1* | 4/2022 | Arar | G06V 20/588 |
| 2023/0123723 A1* | 4/2023 | Kim | G06F 3/04815 |
| | | | 701/36 |

* cited by examiner

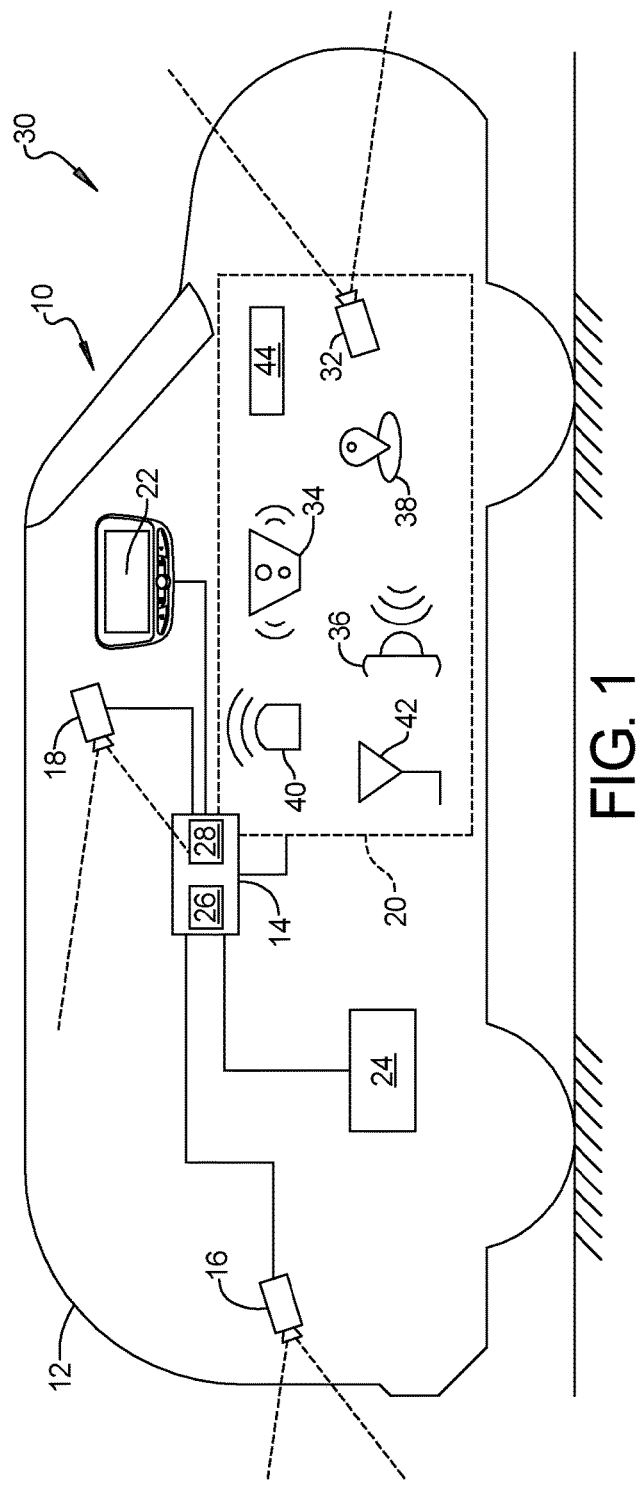
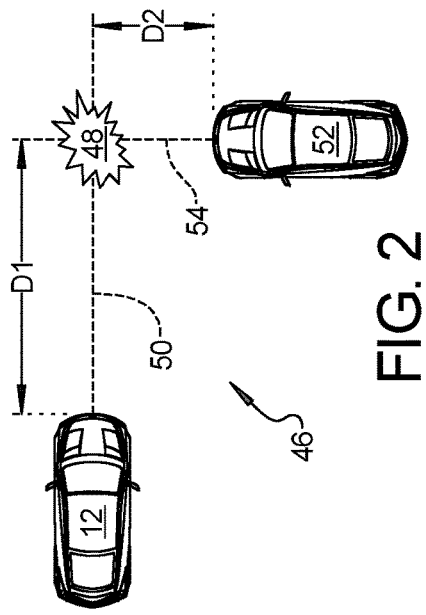

DYNAMICALLY ADJUSTING COLLISION AVOIDANCE METRIC THRESHOLDS BASED ON DRIVER'S FIELD OF VIEW

INTRODUCTION

The present disclosure relates to a system and method in an automotive vehicle which adjusts collision avoidance metrics based on obstructions to a driver's field of view.

Many automobiles today are equipped with sensors that will detect objects in front of the vehicle. These systems use the speed of the vehicle and the distance between the vehicle and the object to calculate collision avoidance metrics such as a distance-to-collision (DTC) and/or a time-to-collision (TTC).

Existing systems do not take into consideration factors which may affect the reaction time of the driver. If the driver's field of view of the environment outside of the vehicle is obstructed, the driver may be unable to react as quickly to a dangerous situation.

Thus, while current systems achieve their intended purpose, there is a need for a new and improved system and method that dynamically adjusts a collision avoidance metric threshold based on the driver's field of view.

SUMMARY

According to several aspects, a system for dynamically calculating collision avoidance metric thresholds for a vehicle is provided. The system includes a vehicle sensor, a passenger position tracking device, and a controller. The controller is in electrical communication with the vehicle sensor and the passenger position tracking device. The controller is programmed to determine a collision avoidance metric using the vehicle sensor, determine an offset to a collision avoidance metric threshold using the passenger position tracking device, and adjust the collision avoidance metric threshold based on the offset. The controller is also programed to compare the collision avoidance metric to the collision avoidance metric threshold and perform an action in response to determining that the collision avoidance metric is less than or equal to the collision avoidance metric threshold.

In another aspect of the present disclosure, to determine the collision avoidance metric, the controller is further programmed to determine a direction of travel of the vehicle using the vehicle sensor, determine an expected path of the vehicle based on the direction of travel of the vehicle, and determine a distance-to-collision with an object which is located on the expected path of the vehicle using the vehicle sensor.

In another aspect of the present disclosure, to determine the distance-to-collision, the controller is further programmed to receive data from a remote vehicle using a vehicle communication system of the vehicle, where the data contains an expected path of the remote vehicle, determine a collision location where the expected path of the vehicle intersects with the expected path of the remote vehicle, and determine a distance-to-collision from the vehicle to the collision location.

In another aspect of the present disclosure, to determine the collision avoidance metric, the controller is further programmed to determine a speed of the vehicle using the vehicle sensor and determine a time-to-collision with the object which is located on the expected path of the vehicle based on the distance-to-collision and the speed of the vehicle.

In another aspect of the present disclosure, to determine the offset, the controller is further programmed to identify obstructions to a driver's field of view of an environment surrounding the vehicle and determine an offset to the collision avoidance metric threshold in response to determining that the driver's field of view of the environment surrounding the vehicle is obstructed.

In another aspect of the present disclosure, to identify obstructions, the controller is further programmed to identify passengers of the vehicle which are obstructing the driver's field of view of the environment surrounding the vehicle using the passenger position tracking device and identify obstructions to a backup camera of the vehicle.

In another aspect of the present disclosure, to identify passengers of the vehicle which are obstructing the driver's field of view of the environment surrounding the vehicle, the controller is further programmed to record an image of the interior of the vehicle using the passenger position tracking device, where the passenger position tracking device is an interior camera. The controller is further programmed to identify passengers obstructing the driver's field of view of the environment surrounding the vehicle using the image and a machine learning algorithm.

In another aspect of the present disclosure, to adjust the collision avoidance metric threshold, the controller is further programmed to add the offset to the collision avoidance metric threshold.

In another aspect of the present disclosure, to perform the action, the controller is further programmed to notify a driver of the vehicle using a human-machine-interface (HMI) of the vehicle.

In another aspect of the present disclosure, to perform the action, the controller is further programmed to stop the vehicle using an automatic braking system of the vehicle.

According to several aspects, a method for dynamically calculating collision avoidance metric thresholds for a vehicle is provided. The method includes determining a collision avoidance metric using a vehicle sensor. The method also includes calculating an offset to a collision avoidance metric threshold. The method also includes adjusting the collision avoidance metric threshold by adding the offset to the collision avoidance metric threshold. The method also includes comparing the collision avoidance metric to the collision avoidance metric threshold. The method also includes performing an action in response to determining that the collision avoidance metric is less than or equal to the collision avoidance metric threshold.

In another aspect of the present disclosure, determining a collision avoidance metric further may include determining a direction of travel of the vehicle using the vehicle sensor, determining an expected path of the vehicle based on the direction of travel of the vehicle, and determining a distance-to-collision with an object which is located on the expected path of the vehicle using the vehicle sensor.

In another aspect of the present disclosure, determining a distance-to-collision further may include receiving data from a remote vehicle using a vehicle communication system of the vehicle, where the data contains an expected path of the remote vehicle, determining a collision location where the expected path of the vehicle intersects with the expected path of the remote vehicle, and determining a distance-to-collision from the vehicle to the collision location.

In another aspect of the present disclosure, determining a determining a collision avoidance metric further may include determining a speed of the vehicle using the vehicle sensor, and determining a time-to-collision with the object which is located on the expected path of the vehicle based on the distance-to-collision and the speed of the vehicle.

In another aspect of the present disclosure, calculating an offset to the collision avoidance metric threshold further may include identifying obstructions to a driver's field of view of an environment surrounding the vehicle using at least one of: an interior camera of the vehicle, and a backup camera of the vehicle. Calculating an offset to the collision avoidance metric threshold further may include calculating an offset to the collision avoidance metric threshold in response to determining that the driver's field of view of the environment surrounding the vehicle is obstructed.

In another aspect of the present disclosure, identifying obstructions further may include recording a first image using the interior camera of the vehicle, recording a second image using the backup camera of the vehicle, identifying passengers obstructing the driver's field of view of the environment surrounding the vehicle using the first image and a machine learning algorithm, and identifying objects obstructing the driver's field of view of an environment behind the vehicle using the second image and a machine learning algorithm.

In another aspect of the present disclosure, performing the action further may include notifying a driver of the vehicle using a human-machine-interface (HMI) of the vehicle and stopping the vehicle using an automatic braking system of the vehicle.

According to several aspects, a system for dynamically calculating collision avoidance metric thresholds for a vehicle is provided. The system includes a vehicle sensor, a backup camera, and an interior camera. The system also includes a controller in electrical communication with the vehicle sensor, the backup camera, and the interior camera, where the controller is programmed to determine a direction of travel of the vehicle using the vehicle sensor, determine an expected path of the vehicle based on the direction of travel of the vehicle, and determine a distance-to-collision with an object which is located on the expected path of the vehicle using the vehicle sensor. The controller is further programmed to determine an offset to a distance-to-collision threshold using at least one of: the backup camera and the interior camera and adjust the distance-to-collision threshold by adding the offset to the distance-to-collision threshold. The controller is further programmed to compare the distance-to-collision to the distance-to-collision threshold and perform an action in response to determining that the distance-to-collision is less than or equal to the distance-to-collision threshold.

In another aspect of the present disclosure, to determine the offset, the controller is further programmed to record a first image using the interior camera and record a second image using the backup camera. To determine the offset, the controller is further programmed to identify passengers obstructing the driver's field of view of an environment surrounding the vehicle using the first image and a machine learning algorithm and identify objects obstructing the driver's field of view of an environment behind the vehicle using the second image and a machine learning algorithm. To determine the offset, the controller is further programmed to determine an offset to the distance-to-collision threshold in response to determining that at least one of: the driver's field of view of the environment surrounding the vehicle is obstructed and the driver's field of view of the environment behind the vehicle is obstructed.

In another aspect of the present disclosure, to perform the action, the controller is further programmed to notify a driver of the vehicle using a human-machine-interface (HMI) of the vehicle and stop the vehicle using an automatic braking system of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic diagram of a system for dynamically calculating collision avoidance metrics for a vehicle according to an exemplary embodiment;

FIG. 2 is an exemplary vehicle collision situation according to an exemplary embodiment;

DETAILED DESCRIPTION

Figure 3:
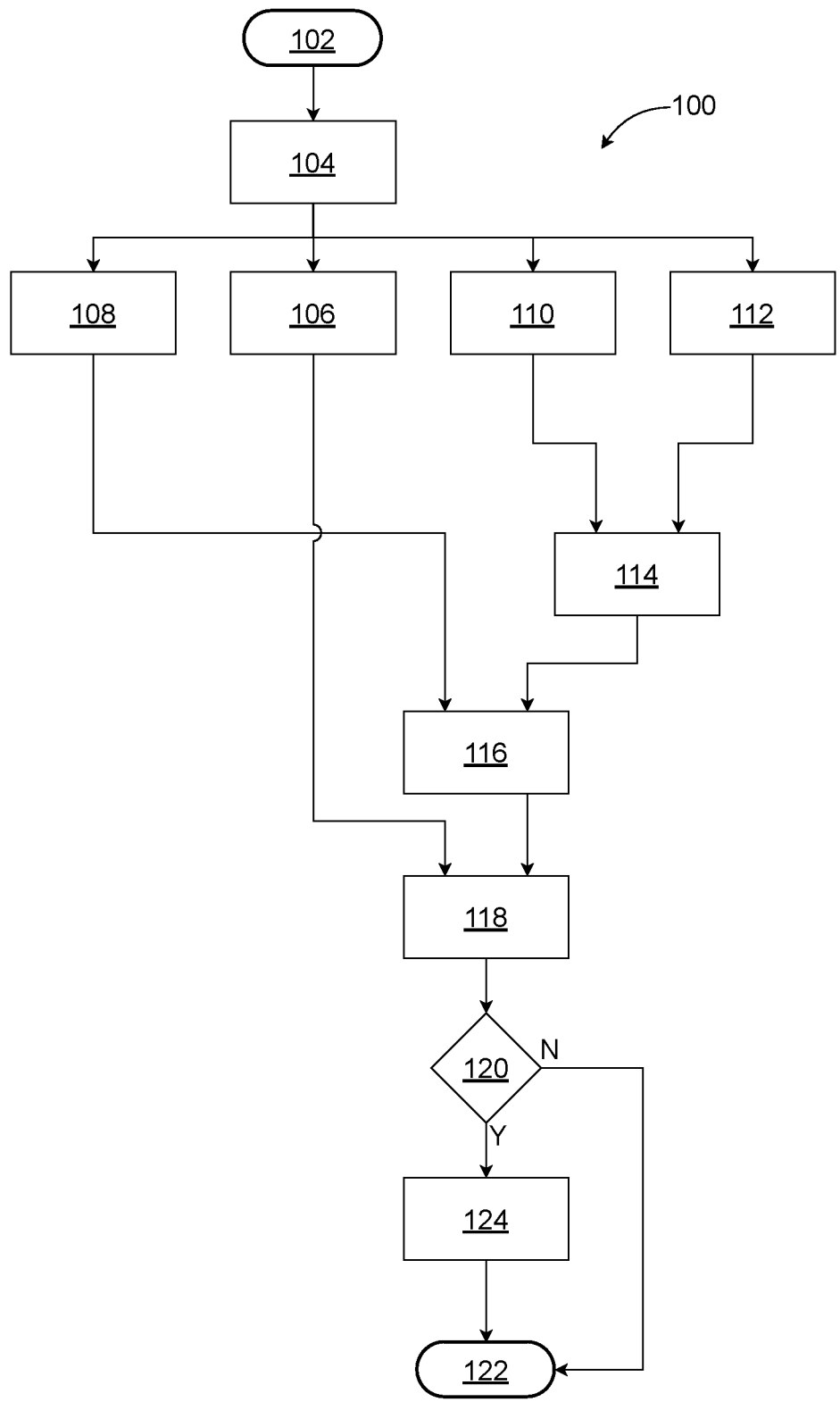
FIG. 3 is a flowchart of a method for dynamically calculating collision avoidance metric thresholds for a vehicle according to an exemplary embodiment.

The following description is merely exemplary in nature and is not intended to limit the present disclosure, application, or uses.

Referring to FIG. 1, a system for dynamically calculating collision avoidance metrics for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, an exterior camera 16, a passenger position tracking device 18, vehicle sensors 20, a human-machine interface (HMI) 22 and an automatic braking system 24.

The controller 14 is used to implement a method 100 for dynamically calculating collision avoidance metric thresholds for a vehicle, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 28 may include volatile and non-volatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the exterior camera 16, the passenger position tracking device 18, the vehicle sensors 20, the human-machine interface (HMI) 22, and the automatic braking system 24. The electrical communication may be established using, for example, a CAN bus, a WiFi network, a cellular data network, or the like. One skilled in the art will appreciate that various additional wired and wireless techniques and communication protocols may be used to communicate with the controller 14.

The exterior camera 16 is used to provide a driver of the vehicle 12 with a view of an environment 30 surrounding the vehicle 12. The exterior camera 16 may be, for example, a rear-view camera, a side-view camera, or a front-view camera. The vehicle 12 may also include multiple exterior cameras 16 positioned to view various perspectives of the environment 30 surrounding the vehicle 12. In an exemplary embodiment shown in FIG. 1, the exterior camera 16 is a rear-view camera. The exterior camera 16 is in electrical communication with the controller 14 as described above. The exterior camera 16 is activated by the controller 14 and provides a video signal to a display device in the vehicle 12. The display device may be, for example, the HMI 22, a head up display (HUD), an electronic rear-view mirror, or the like. One skilled in the art will appreciate that various additional methods for providing video information from the exterior camera 16 to the driver may be used.

The passenger position tracking device 18 is used to provide the controller 14 with information about a position of a passenger in the vehicle 12. The passenger position tracking device 18 may also be capable of monitoring the position of multiple passengers of the vehicle 12. In an exemplary embodiment shown in FIG. 1, the passenger position tracking device 18 is an interior camera. The passenger position tracking device 18 may also consist of multiple interior cameras configured to view portions of an interior of the vehicle 12. The passenger position tracking device 18 is in electrical communication with the controller 14 as described above. The controller 14 uses the passenger position tracking device 18 to determine a position of each passenger in the vehicle 12, as discussed below in reference to the method 100.

The vehicle sensors 20 are used to gather information about the environment 30 surrounding the vehicle 12, for example, the layout of the environment 30 and/or distance measurements from the vehicle 12 to objects in the environment 30. The information about the environment 30 gathered by the vehicle sensors 20 is used to determine a collision avoidance metric (the collision avoidance metric is discussed in further detail in reference to FIG. 2 below). In a non-limiting example, the vehicle sensors 20 include a camera 32 configured to view the environment 30 outside of the vehicle, a lidar system 34, a radar system 36, a global positioning system (GPS) 38, an ultrasound system 40, and a vehicle communication system 42. The plurality of vehicle sensors 20 additionally includes connections to vehicle systems 44 providing information such as a vehicle steering angle, vehicle speed, vehicle braking, and vehicle acceleration. The vehicle sensors 20 are in electrical communication with the controller 14 as described above.

The vehicle communication system 42 is used by the controller 14 to communicate with other systems. For example, the vehicle communication system 42 includes capabilities for communication with vehicles ("V2V" communication), infrastructure ("V2I" communication), remote systems at a remote call center (e.g., ON-STAR by GENERAL MOTORS) and/or personal devices. In certain embodiments, the vehicle communication system 42 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the vehicle communication system 42 may include one or more antennas and/or communication transceivers for receiving and/or transmitting signals, such as cooperative sensing messages (CSMs). The vehicle communication system 42 is configured to wirelessly communicate information between the vehicle 12 and another vehicle. Further, the vehicle communication system 42 is configured to wirelessly communicate information between the vehicle 12 and infrastructure or other vehicles. The vehicle communication system 42 is considered to be one of the vehicle sensors 20 and thus is in electrical communication with the controller 14 as described above.

The HMI 22 is used to display information to the driver of the vehicle. The HMI 22 may include a touchscreen mounted in view of the driver, a HUD, or other device configured to provide information to the driver, such as an indicator light in a dashboard of the vehicle 12. The HMI 22 is in electrical communication with the controller 14 as described above. The controller 14 may use the HMI 22 to display notifications pertaining to the collision avoidance metric, as discussed below in reference to the method 100.

The automatic braking system 24 is used to automatically bring the vehicle 12 to a stop. The automatic braking system 24 includes actuators which are electrically activated by the controller 14 to control a braking system of the vehicle 12. For example, if the controller 14 determines that a collision is imminent, the controller 14 can use the automatic braking system 24 to stop the vehicle 12 before the collision occurs. The automatic braking system 24 is in electrical communication with the controller 14 as described above.

Referring to FIG. 2, an exemplary vehicle collision situation 46 is shown. In the present disclosure, the collision avoidance metric includes a distance-to-collision and/or a time-to-collision. In an exemplary embodiment, to calculate the collision avoidance metric, the controller 14 first determines a collision location 48. The collision location 48 is a location along the expected path 50 of the vehicle 12 where the vehicle 12 is expected to collide with an object, for example, a remote vehicle 52. To determine the collision location 48, the controller 14 determines a direction of travel of the vehicle 12 and the remote vehicle 52, calculates an expected path 50 of the vehicle 12 and an expected path 54 of the remote vehicle 52, and determines a speed of the vehicle 12 and the remote vehicle 52. The collision location 48 is calculated based on the expected path 50 of the vehicle 12, the expected path 54 of the remote vehicle 52, and the speed of both the vehicle 12 and the remote vehicle 52. The distance-to-collision D1 is defined as a distance between the vehicle 12 and the collision location 48 as measured along the expected path 50 of the vehicle 12. The time-to-collision is defined as a time until the vehicle 12 reaches the collision location 48 and is calculated based on the distance-to-collision D1 and the speed of the vehicle 12. The remote vehicle 52 may also calculate collision avoidance metrics, for example, a remote vehicle distance-to-collision D2.

To determine the collision location 48 as described above, the controller 14 may use the vehicle sensors 20 to obtain information about the direction of travel, expected path, and speed of both the vehicle 12 and the remote vehicle 52. For example, the controller 14 may use the camera 32 in conjunction with the lidar system 34 to identify a collision situation and measure distances to the remote vehicle 52. In a further example, the controller 14 may use the vehicle communication system 42 to send and receive data to and from the remote vehicle 52 as described above. The data includes location, speed, and direction information for the vehicle 12 and the remote vehicle 52. The data is used by the controller 14 to calculate the collision avoidance metrics.

In addition to the collision avoidance metric, a collision avoidance metric threshold is also determined. In the present disclosure, the collision avoidance metric threshold includes a distance-to-collision threshold and/or a time-to-collision threshold. If the collision avoidance metric is below the collision avoidance metric threshold, the system 10 takes action to prevent a collision from occurring. In a non-limiting example, if the distance-to-collision is less than or equal to the distance-to-collision threshold, the system 10 may display a warning to the driver using the HMI 22 of the vehicle 12. The collision avoidance metric threshold may be pre-determined or may be dynamically calculated based on factors such as vehicle speed. Additionally, the controller 14 may use the passenger position tracking device 18 to dynamically adjust the collision avoidance metric threshold using an offset to the collision avoidance metric threshold, as discussed below in reference to the method 100.

Referring to FIG. 3, a flowchart of the method 100 for dynamically calculating collision avoidance metric thresholds for a vehicle is shown. The method 100 begins at block 102 and proceeds to block 104. At block 104, the direction of travel and expected path of the vehicle 12 is determined using the vehicle sensors 20. After block 104, the method 100 proceeds to blocks 106, 108, 110, and 112.

At block 106, the collision avoidance metric is calculated by the controller 14 using the vehicle sensors 20. As discussed above, the collision avoidance metric may be the distance-to-collision and/or the time-to-collision to the object along the expected path of the vehicle 12, as determined at block 104. The determination of the collision avoidance metric is discussed in further detail above in reference to FIG. 2.

At block 108, the collision avoidance metric threshold is calculated. The collision avoidance metric threshold may be pre-determined and saved in the computer readable storage device 28 of the controller 14 or may be determined based on information received from the vehicle sensors 20, such as the speed of the vehicle 12. In a non-limiting example, the collision avoidance metric threshold may be higher if the vehicle 12 is traveling at a high rate of speed as more time and/or distance is required for the vehicle 12 to come to a stop.

At block 110, the passenger position tracking device 18 is used to determine if the driver's field of view of the environment 30 outside of the vehicle 12 is obstructed. In one example, the driver's field of view may be obstructed by passengers inside the vehicle 12. Where the passenger position tracking device 18 is an interior camera, the controller 14 activates the interior camera to record an interior image of the interior of the vehicle 12. The interior image is then processed to determine if the driver's view is obstructed by another passenger of the vehicle 12. The interior image may be processed by the controller 14 using a machine learning algorithm or other image processing technique. The driver's field of view may be determined in a binary manner to be either obstructed or unobstructed, or an extent to which the driver's field of view is obstructed may be quantified, for example, by a percentage.

At block 112, the exterior camera 16 is used to determine obstructions to the driver's field of view of the environment 30 outside of the vehicle 12 caused by foreign objects blocking the exterior camera 16, for example dirt or mud. The controller 14 activates the exterior camera 16 to record an exterior image. The exterior image is then processed to determine if the view provided by the exterior camera 16 to the driver using the HMI 22 is obstructed by foreign objects. The exterior image may be processed by the controller 14 using a machine learning algorithm or other image processing technique, such as comparing the exterior image with known obstructed exterior images stored in the computer readable storage device 28 of the controller 14. The view provided by the exterior camera 16 may be determined in a binary manner to be either obstructed or unobstructed, or an extent to which the view is obstructed may be quantified, for example, by a percentage. After blocks 106, 108, 110, and 112, the method 100 proceeds to block 114.

At block 114, the offset to the collision avoidance metric threshold is determined. The offset is determined based on the determinations of obstructions to the driver's field of view of the environment 30 in blocks 110 and 112. The offset may be retrieved from a look-up table or calculated using an algorithm. If the driver's view is not obstructed as determined in blocks 110 and 112, the offset is set to zero or otherwise not used. If either of blocks 110 and/or 112 determine that the driver's view is obstructed, the offset is an amount greater than zero. The offset may be determined based on a binary determination of obstruction of the driver's view or proportional to the total obstruction of the driver's view. Where the offset is to the time-to-collision threshold, the offset is an amount of time. Where the offset is to the distance-to-collision threshold, the offset is a distance.

In one exemplary embodiment, if the driver's view is obstructed, the offset to the distance-to-collision threshold is set to a fixed distance, for example 5 meters. In another exemplary embodiment, if the driver's view is obstructed, the offset to the time-to-collision threshold is set to a fixed time, for example 1 second. In another exemplary embodiment, if block 110 determines the driver's view to be 30% obstructed, and block 112 determines the driver's view to be 60% obstructed, the total obstruction is calculated to be 90%. Thus, the offset to the time-to-collision threshold is set to 900 milliseconds. In another exemplary embodiment, if block 110 determines the driver's view to be 30% obstructed, and block 112 determines the driver's view to be 52% obstructed, the total obstruction is calculated to be 80%. Thus, the offset to the distance-to-collision threshold is set to 8 meters.

In another exemplary embodiment, the offset is determined or modified based on context determined by the vehicle sensors 20. In a non-limiting example, the exterior camera 16 is a backup camera. If the backup camera is determined to be obstructed in block 112, the offset may be increased if the vehicle 12 is in a reverse gear, as the backup camera is relevant to the task of driving the vehicle 12 in reverse. After block 114, the method 100 proceeds to block 116.

At block 116, the collision avoidance metric threshold calculated at block 108 is adjusted based on the offset to the collision avoidance metric threshold determined at block 114. In an exemplary embodiment, the offset may be added to the collision avoidance metric threshold. In a non-limiting example, if the collision avoidance metric is the distance-to-collision, the distance-to-collision threshold is 9 meters, and the offset to the distance-to-collision threshold is 5 meters, then the adjusted distance-to-collision threshold is 14 meters. In another exemplary embodiment, the offset may be a percentage increase of the collision avoidance metric threshold. In a non-limiting example, the offset may be a 10% increase, thus the collision avoidance metric threshold is increased by 10%. After block 116, the method 100 proceeds to block 118.

At block 118, the collision avoidance metric from block 106 is compared to the adjusted collision avoidance metric threshold from block 114. After block 118, the method 100 proceeds to block 120.

At block 120, the result of the comparison at block 118 is evaluated. If the collision avoidance metric from block 106 is not less than or equal to the adjusted collision avoidance metric threshold from block 114, the method 100 enters a standby state at block 122. If the collision avoidance metric from block 106 is less than or equal to the adjusted collision avoidance metric threshold from block 114, the method 100 proceeds to block 124.

At block 124, an action is taken to prevent a collision from occurring. In an exemplary embodiment, the action is a notification displayed on the HMI 22 or a HUD of the vehicle 12 to warn the driver. In another exemplary embodiment, the controller 14 activates the automatic braking system 24 to bring the vehicle 12 to a stop, thus avoiding the collision. In another exemplary embodiment, the vehicle path is altered to avoid the collision. Multiple actions may be taken. After block 124, the method 100 proceeds to the standby state at block 122.

The system 10 and method 100 of the present disclosure have many advantages. Obstructions to the driver's view outside of the vehicle 12 may increase the reaction time needed for the driver to react to a dangerous situation and prevent a collision. By dynamically adjusting the collision avoidance metric thresholds based on observations of the passenger position tracking device 18 and the exterior camera 16, the system 10 may more effectively prevent collisions.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for dynamically calculating collision avoidance metric thresholds for a vehicle, the method comprising:
    determining a collision avoidance metric using a vehicle sensor, wherein the collision avoidance metric includes one of: a distance-to-collision and a time-to-collision;
    identifying passengers within the vehicle which obstruct a driver's field of view of an environment surrounding the vehicle;
    calculating an offset to a collision avoidance metric threshold in response to determining that the driver's field of view of the environment surrounding the vehicle is obstructed by the passengers within the vehicle, wherein the collision avoidance metric threshold includes at least one of: a distance-to-collision threshold and a time-to-collision threshold;
    adding the offset to the collision avoidance metric threshold;
    comparing the collision avoidance metric to the collision avoidance metric threshold; and
    performing an action in response to determining that the collision avoidance metric is less than or equal to the collision avoidance metric threshold.

2. The method of claim 1, wherein determining the collision avoidance metric further comprises:
    determining a direction of travel of the vehicle using the vehicle sensor;
    determining an expected path of the vehicle based on the direction of travel of the vehicle; and
    determining the distance-to-collision with an object which is located on the expected path of the vehicle using the vehicle sensor.

3. The method of claim 2, wherein determining the distance-to-collision further comprises:
    receiving data from a remote vehicle using a vehicle communication system of the vehicle, wherein the data contains an expected path of the remote vehicle;
    determining a collision location where the expected path of the vehicle intersects with the expected path of the remote vehicle; and
    determining the distance-to-collision from the vehicle to the collision location.

4. The method of claim 2, wherein determining the collision avoidance metric further comprises:
    determining a speed of the vehicle using the vehicle sensor; and
    determining the time-to-collision with the object which is located on the expected path of the vehicle based on the distance-to-collision and the speed of the vehicle.

5. The method of claim 1, wherein identifying passengers within the vehicle which obstruct the driver's field of view further comprises:
    identifying the passengers obstructing the driver's field of view of the environment surrounding the vehicle using an interior camera of the vehicle.

6. The method of claim 5, wherein identifying the passengers obstructing the driver's field of view of the environment surrounding the vehicle further comprises:
    recording a first image using the interior camera of the vehicle; and
    identifying the passengers obstructing the driver's field of view of the environment surrounding the vehicle using the first image and a machine learning algorithm.

7. The method of claim 1, wherein performing the action further comprises:
    notifying a driver of the vehicle using a human-machine-interface (HMI) of the vehicle; and
    stopping the vehicle using an automatic braking system of the vehicle.

8. A system for dynamically calculating collision avoidance metric thresholds for a vehicle, the system comprising:
    a vehicle sensor;
    a passenger position tracking device; and
    a controller in electrical communication with the vehicle sensor and the passenger position tracking device, wherein the controller is programmed to:
        determine a distance-to-collision between the vehicle and a collision location measured along an expected path of the vehicle using the vehicle sensor;
        identify passengers in the vehicle which are obstructing a driver's field of view of an environment surrounding the vehicle using the passenger position tracking device;
        determine an offset to a distance-to-collision threshold in response to determining that the driver's field of view of the environment surrounding the vehicle is obstructed by the passengers in the vehicle;
add the offset to the distance-to-collision threshold;
compare the distance-to-collision to the distance-to-collision threshold; and
perform an action in response to determining that the distance-to-collision is less than or equal to the distance-to-collision threshold.

9. The system of claim 8, wherein to determine the distance-to-collision, the controller is further programmed to:
determine a direction of travel of the vehicle using the vehicle sensor;
determine the expected path of the vehicle based on the direction of travel of the vehicle; and
determine the distance-to-collision with an object which is located on the expected path of the vehicle using the vehicle sensor.

10. The system of claim 9, wherein to determine the distance-to-collision, the controller is further programmed to:
receive data from a remote vehicle using a vehicle communication system of the vehicle, wherein the data contains an expected path of the remote vehicle;
determine the collision location where the expected path of the vehicle intersects with the expected path of the remote vehicle; and
determine the distance-to-collision from the vehicle to the collision location.

11. The system of claim 8, wherein to determine the offset, the controller is further programmed to:
identify obstructions to a backup camera of the vehicle; and
determine the offset to the distance-to-collision threshold in response to identifying obstructions to the backup camera of the vehicle.

12. The system of claim 8, wherein to identify passengers of the vehicle which are obstructing the driver's field of view of the environment surrounding the vehicle, the controller is further programmed to:
record an image of an interior of the vehicle using the passenger position tracking device, wherein the passenger position tracking device is an interior camera; and
identify passengers obstructing the driver's field of view of the environment surrounding the vehicle using the image and a machine learning algorithm.

13. The system of claim 8, wherein to perform the action, the controller is further programmed to notify a driver of the vehicle using a human-machine-interface (HMI) of the vehicle.

14. The system of claim 8, wherein to perform the action, the controller is further programmed to stop the vehicle using an automatic braking system of the vehicle.

15. A system for dynamically calculating collision avoidance metric thresholds for a vehicle, the system comprising:
a vehicle sensor;
a backup camera;
an interior camera; and
a controller in electrical communication with the vehicle sensor, the backup camera, and the interior camera, wherein the controller is programmed to:
determine a direction of travel of the vehicle using the vehicle sensor;
determine an expected path of the vehicle based on the direction of travel of the vehicle;
determine a distance-to-collision with an object which is located on the expected path of the vehicle using the vehicle sensor;
determine an offset to a distance-to-collision threshold in response to determining that a driver's field of view of an environment surrounding the vehicle is obstructed by a passenger in the vehicle using the interior camera, wherein the offset is determined based at least in part on a passenger obstruction percentage;
adjust the distance-to-collision threshold by adding the offset to the distance-to-collision threshold;
compare the distance-to-collision to the distance-to-collision threshold; and
perform an action in response to determining that the distance-to-collision is less than or equal to the distance-to-collision threshold.

16. The system of claim 15, wherein to determine the offset, the controller is further programmed to:
record a first image using the interior camera;
identify the passenger obstructing the driver's field of view of the environment surrounding the vehicle using the first image and a machine learning algorithm;
determine the passenger obstruction percentage based at least in part on identifying the passenger obstructing the driver's field of view, wherein the passenger obstruction percentage indicates a proportion of the driver's field of view which is obstructed by the passenger; and
determine the offset to the distance-to-collision threshold in response to determining that the driver's field of view of the environment surrounding the vehicle is obstructed by the passenger, wherein the offset is determined based at least in part on the passenger obstruction percentage.

17. The system of claim 15, wherein the controller is further programmed to:
record a second image using the backup camera;
identify an object obstructing the driver's field of view of an environment behind the vehicle using the second image and a machine learning algorithm; and
determine the offset to the distance-to-collision threshold in response to determining that the driver's field of view of the environment behind the vehicle is obstructed.

* * * * *